(12) United States Patent
Fallis et al.

(10) Patent No.: US 7,644,061 B1
(45) Date of Patent: Jan. 5, 2010

(54) MANAGING RESOURCE INDEXES IN A NETWORKING ENVIRONMENT

(75) Inventors: Kevin Michael Fallis, Overland Park, KS (US); Kenneth James Aubuchon, Lenexa, KS (US); Kay Ellen Mitchell, Kansas City, MO (US); Stephan Dwayne Thomasee, Gladstone, MO (US); Daniel Christopher Wieschhaus, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 318 days.

(21) Appl. No.: 11/760,993

(22) Filed: Jun. 11, 2007

Related U.S. Application Data

(63) Continuation of application No. 10/727,863, filed on Dec. 4, 2003, now Pat. No. 7,251,659.

(51) Int. Cl.
*G06F 7/00* (2006.01)
*G06F 17/00* (2006.01)
*G06F 17/30* (2006.01)

(52) U.S. Cl. .................. 707/1; 707/100; 707/102

(58) Field of Classification Search ............ 707/1–3, 707/100–102, 204, 205; 709/219
See application file for complete search history.

(56) References Cited

U.S. PATENT DOCUMENTS

| 5,675,797 | A  | * | 10/1997 | Chung et al. ............. 718/104 |
| 5,982,390 | A  | * | 11/1999 | Stoneking et al. ......... 345/474 |
| 6,032,183 | A  | * | 2/2000  | Chen et al. ............... 709/223 |
| 6,115,793 | A  | * | 9/2000  | Gruber et al. ............ 711/133 |
| 6,819,670 | B1 | * | 11/2004 | Fenner .................... 370/392 |
| 2003/0154210 | A1 | * | 8/2003 | Teig et al. ............... 707/102 |

* cited by examiner

*Primary Examiner*—Don Wong
*Assistant Examiner*—Merilyn P Nguyen

(57) ABSTRACT

A method, apparatus, and medium are provided for assigning indexes to a set of index-based resources. The method includes providing an index-based-resource manager (IBRM), requesting one or more indexes to be allocated to a desired number of resources, directing the request to the IBRM, identifying indexes available to be allocated, and allocating the identified indexes to be associated with the one or more resources. The present invention also contemplates transactional processing, enabling deallocation and querying of indexes.

20 Claims, 4 Drawing Sheets

US 7,644,061 B1

MANAGING RESOURCE INDEXES IN A NETWORKING ENVIRONMENT

CROSS-REFERENCE TO RELATED APPLICATIONS

This application is a Continuation of prior application Ser. No. 10/727,863, filed Dec. 4, 2003.

STATEMENT REGARDING FEDERALLY SPONSORED RESEARCH OR DEVELOPMENT

Not applicable.

TECHNICAL FIELD

This invention relates to the field of allocating indexes associated with network resources in a communications networking environment. More particularly, the present invention relates to the field of preventing duplicate resource-index assignments.

BACKGROUND OF THE INVENTION

A telecommunications network is composed of a variety of components, such as switches, routers, signal-control points, and a litany of other network elements. Switches contain tables of data that help establish pathways between a source and a destination. The tables store data such as customer information, routing data, network-architecture information, and more. The number of tables varies greatly and depends upon the type of switch or computing device. The data in these tables enable a variety of communications to be established; from connecting a first residential caller to a second residential caller to transmitting data packets around the globe. Table data is not stagnant. On the contrary, as network-component data is modified, new area codes are added, customer services are varied, and other virtually unlimited modifications take place; table data continually changes.

Switches contain internal data such as route-reference indexes (route lists), data-manipulation indexes, and trunk-group references. Switch vendors do not provide a database interface for their customers to use. Accordingly, communications carriers must manage indexes on a table or resource on an external system or network element (external resource) that is not physically managed by its software. Further, they must ensure that multiple applications accessing these tables do not accidentally utilize an index on the external resource that may be owned by another application. Moreover, because only a limited number of indexes exist on the resource, the indexes should be partitioned into ranges or pools that can be shared by some applications yet are not exposed to other applications.

There is a current need in the art to provide the above-mentioned functionality and to manage the index data that relates to various resources of a communications network. These indexes are often shared resources that are used and then freed, or allocated and deallocated. Currently, managing these resources is complex, difficult, and often leads to situations where customers are put out of service because indexes can unknowingly be allocated to multiple resources or overwritten with undesired data. That is, prior to completing the assignment of an index to a resource, that index may be allocated to a different resource. This could prevent one or both resources from functioning properly. The current state of the art could be improved by providing a resource manager to monitor used and available indexes, to receive requests for new index allocations, and to allocate and deallocate these resources as needed.

SUMMARY OF THE INVENTION

The present invention solves at least the above problems by providing a system and method that allocates a unique index to a desired index-based resource. An index-based resource may be an external resource that utilizes indexes (numeric, alphanumeric, etc.) to organize data so that there is an order to which the data is presented. Exemplary external resources include communications routes, database tables, office facilities, and hardware elements, such as telecommunications switches, routers, signal-transfer points, and the like. The present invention has several practical applications in the technical arts including eliminating the possibility that an index will be nonuniquely allocated. That is, the present invention prevents an index from being erroneously allocated to two or more network components.

In one aspect of the present invention, a method is provided for assigning indexes to a set of index-based resources. The method includes providing an index-based-resource manager (IBRM), which will be described in greater detail below; requesting one or more indexes to be allocated to a desired number of resources, directing the request to the IBRM, identifying indexes available to be allocated, and allocating the identified indexes to be associated with the one or more resources.

In another aspect, the present invention includes computer-useable instructions that perform a method of managing resource indexes in a communications networking environment. The instructions enable receiving one or more requests to identify a set of indexes available for allocation. The indexes are to be respectively associated with one or more network resources, such as those referenced above. The instructions also provide for querying a data-storage component to identify a set of available indexes consistent with the request(s). The indexes are then flagged or otherwise denoted as being unavailable for subsequent allocation, thus ensuring the index(es) are uniquely allocated. The indexes are then communicated to the requesting component.

In a final aspect, the present invention provides a system for preventing duplicate resource-index assignments in a communications networking environment. The system includes an index-based-resource manger (IBRM) for receiving requests to manipulate indexes associated with one or more network resources, a data store coupled to the IBRM, and a user interface coupled to the IBRM for communicating index data associated with manipulating the indexes. Manipulating can include allocating, deallocating, querying, and the like.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

Figure 1:
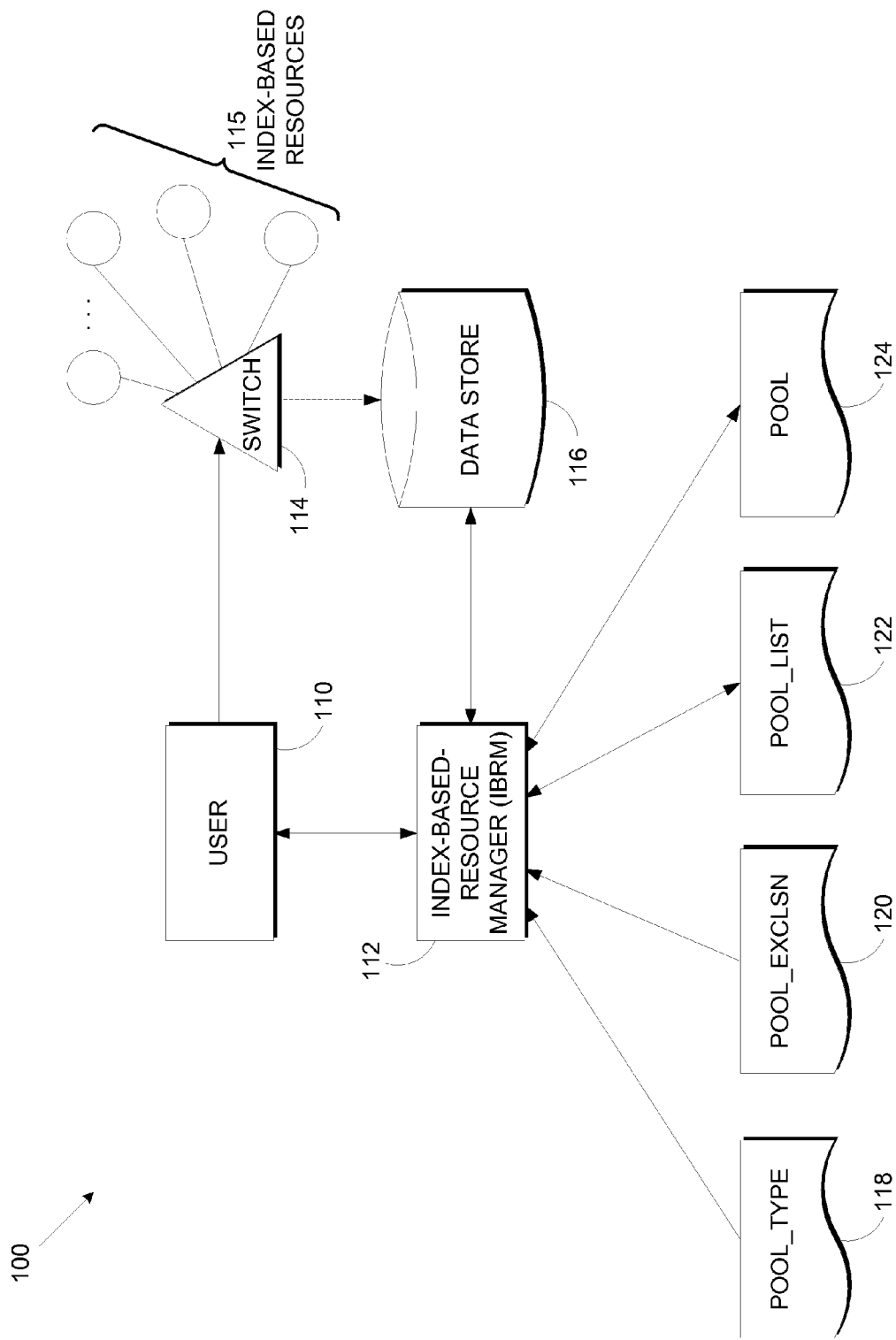
FIG. 1 depicts an exemplary operating environment suitable for practicing an embodiment of the present invention.

The present invention provides an apparatus and method for managing indexes associated with index-based resources of a communications network. The present invention will be better understood from the detailed description provided below and from the accompanying drawings of various embodiments of the invention. The detailed description and drawings, however, should not be read to limit the invention to the specific embodiments. Rather, these specifics are provided for explanatory purposes that help the invention to be better understood.

Specific hardware devices, programming languages, components, processes, and numerous details including operating environments and the like are set forth to provide a thorough understanding of the present invention. In other instances, structures, devices, and processes are shown in block diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

Various technical terms are used throughout this description. A definition of such terms can be found in *Newton's Telecom Dictionary* by H. Newton, 19th Edition (2003). These definitions are intended to provide a clearer understanding of the ideas disclosed herein but are in no way intended to limit the scope of the present invention. The definitions and terms should be interpreted broadly and liberally to the extent allowed the meaning of the words offered in the above-cited reference.

As one skilled in the art will appreciate, the present invention may be embodied as, among other things: a method, system, or computer-program product. Accordingly, the present invention may take the form of a hardware embodiment, a software embodiment, or an embodiment combining software and hardware. In a preferred embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

The present invention can be applied in a variety of environments, wherever there is a need to accurately store data in a concurrent-access environment. To help explain the invention without obscuring its functionally, a preferred embodiment will now be referenced in connection with a telecommunications network. Although the present invention can be employed in connection with a telecommunications-networking environment, it should not be construed as limited to the applications provided here for illustrative purposes. Accordingly, FIG. 1 indicates an exemplary operating environment suitable for practicing the present invention and is referenced generally by the numeral 100.

Operating environment 100 includes a user 110, coupled to an index-based-resource manager (IBRM) 112—also referred to herein as a "pool manager"—and to a switch 114, which is coupled to a variety of resources 115. A resource can be any network element or groups of elements that are associated with an index. Switch 114 is coupled to a data store 116, which is also coupled to pool manager 112. Four illustrative tables are shown in connection with IBRM 112 including a Pool_Type table 118, a Pool_Exclsn table 120, a Pool_List table 122, and a Pool table 124.

User 110 may be a person, computer application, or other requesting component. IBRM 112 is a server class that manages index assignments. As will be explained in greater detail below, managing includes adding pools, deleting pools, allocating indexes, deallocating indexes, setting indexes, and querying pools. Data store 116 is a data-storage device in communication with IBRM 112 that maintains a representation of the contents in switch 114. Data store 116 is shown coupled to switch 114 by a dashed line to indicate that after an initialization process—where data store 116 is initially populated with data corresponding to the data in switch 114—a persistent connection is not necessary because IBRM 112 will dynamically update data store 116.

Tables 118-124 are used in a preferred embodiment to help provide the functionality of the present invention. The provision and structure of tables 118-124 should not be construed as limitations of the present invention. Many equivalent structures can be provided, but simplified, illustrative tables 118 and 124 are provided and explained in greater detail in connection with a preferred embodiment of the present invention.

Pool_Type table 118 controls the type of pools that IBRM 112 can represent. The pool types can relate to various types of tables in switch 114. Pool_Type table 118, in conjunction with the Pool_Exclsn table 120, provides a set of rules for any pool list that is derived from this base description of a pool type. An exemplary structure of Pool_Type table 118 is shown in Table I. "PK" denotes a primary key in a preferred embodiment.

TABLE I

POOL_TYPE

| Field | Values/Rules |
|---|---|
| (PK) POOL_ID | Unique identifier defining a type of pool (i.e., EXDGTRTE or OFRT) |

TABLE I-continued

POOL_TYPE

| Field | Values/Rules |
|---|---|
| (PK) SW_ID | Switch identifier |
| OWNER_CD | ID of a server that controls a pool for a switch |
| POOL_DES | Description, in layman's terms, as to the type of pool |
| ALGNMNT_CD | A beginning range that this pool type represents |
| MAX_SIZE_NBR | An ending range that this pool represents |

Pool_Exclsn table 120 controls exclusions of indexes in a pool. If there are certain indexes that should not be varied (allocated, deallocated, etc.), then Pool_Exclsn table 120 provides a way to denote indexes that are not to be manipulated. Multiple exclusion entries for a table are possible. Pool_Exclsn table 120 allows exclusions to be defined within ranges. An exemplary structure of Pool_Exclsn table 120 is provided in Table II.

TABLE II

POOL_EXCLSN

| Field | Values/Rules |
|---|---|
| (PK) POOL_ID | Unique identifier defining a type of pool (i.e., EXDGTRTE or OFRT) |
| (PK) SW_ID | Switch identifier |
| (PK) SEQ_NBR | A unique number that defines each range for a given pool type |
| BEGIN_RANGE | An indication of the first index in a range of indexes to be excluded |
| END_RANGE | An indication of the last index in a range of indexes to be excluded |

Pool_List table 122 defines the unique pools at the parent level. An exemplary structure for Pool_List table 122 is provided in Table III.

TABLE III

POOL_LIST

| Field | Values/Rules |
|---|---|
| (PK) POOL_ID | Derived from the associated entry in Pool_Type table 118 |
| (PK) SW_ID | Determined by the switch that owns this index/pool type |
| (PK) ACCESS_KEY_CD | Derived by using the Numbering Plan Address or 0 depending on the scenario |

POOL table 124 manages a given segment in a route-pool list. A pool list may include several 128-byte pools. If a soft-switch route list is 64 k in size, then one route list would have 64 segmented pools in a preferred embodiment.

TABLE IV

POOL

| Field | Values/Rules |
|---|---|
| (PK) POOL_ID | Derived from the associated entry in =POOL_LIST |
| (PK) ACCESS_KEY_CD | Derived from the associated entry in =POOL_LIST |
| (PK) SW_ID | Derived from the associated entry in =POOL_LIST |
| (PK) SEG_OFST_CD | Unique range number for a segment in a list starting at 0 |

TABLE IV-continued

POOL

| Field | Values/Rules |
|---|---|
| SEG_BITMAP | 1024 bit range of indexes |
| NXT_INDEX | Next index that can be used for this pool segment. Set to −1 if full. |

Figure 2:
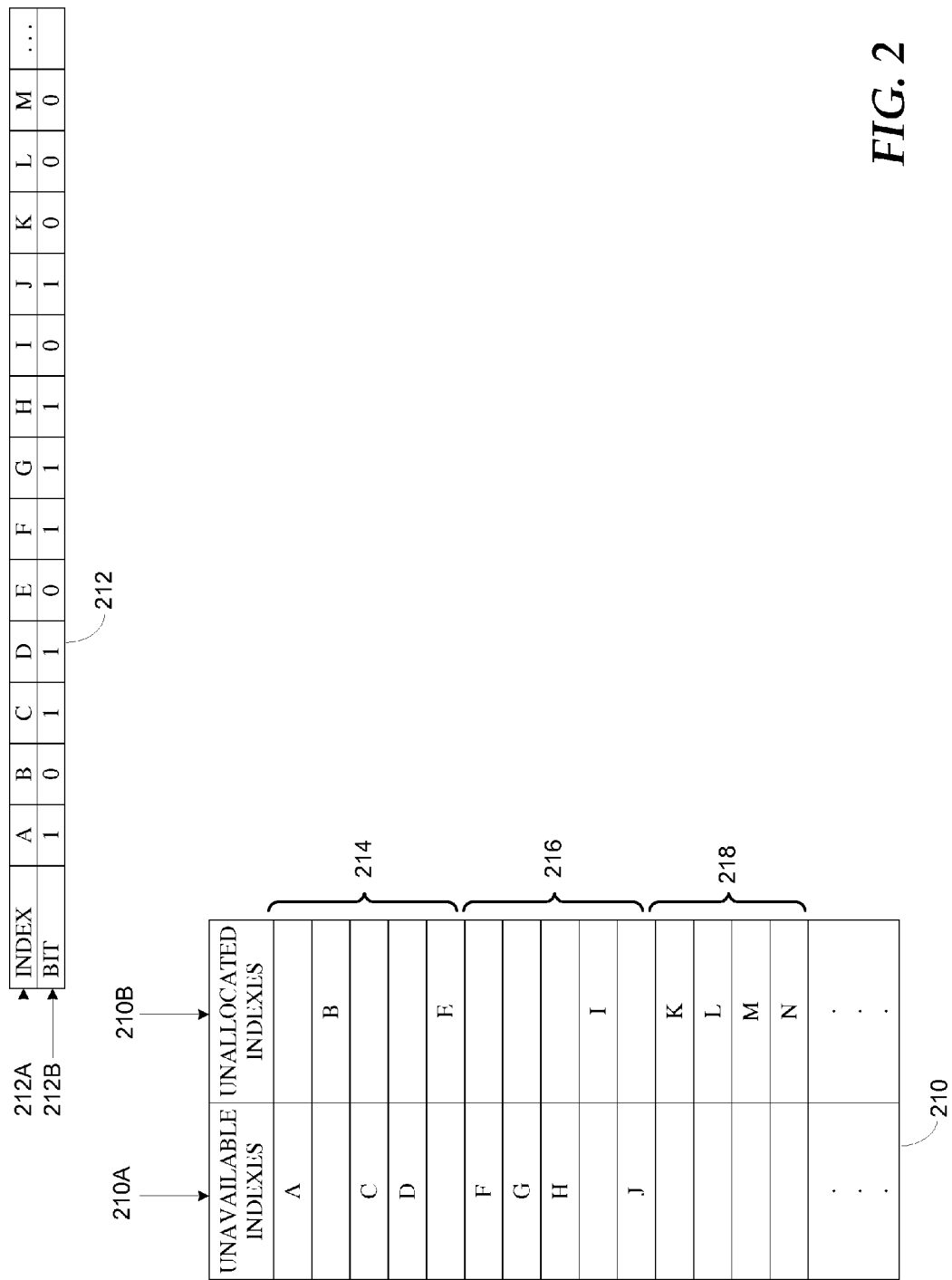
FIG. 2 depicts an exemplary bitmap and index diagram in accordance with an embodiment of the present invention.

As previously indicated, the present invention manages resource indexes. An exemplary resource index is a route-reference index. Rout-reference indexes identify routes in a switch. Turning now to FIG. 2, an exemplary index diagram 210 is provided along with an exemplary bitmap 212. Index diagram 210 is shown with two columns 210A and 210B. Column 210A is associated with a set of unavailable indexes. The indexes are unavailable because they are being used in connection with various resources, such as network elements. Column 210B lists unallocated indexes. The indexes would not even be seen by a requesting component. These indexes would need to be created and then allocated to a resource, such as a route, trunk group, or network element(s).

Also shown in index diagram 210 are index ranges. First, second, and third ranges are shown by numerals 214, 216, and 218. These representative ranges are not necessary but may be provided in an embodiment of the invention. These ranges associate a set of indexes with whatever targets are desired. For example, a first business unit of a company may be associated with range 214, a second business unit may be associated with range 216, and a third business unit may be associated with range 218. Delineating ranges enables the benefit of restricting index allocations. If the first business unit requests an index, then it will be granted an index within range 214 in an embodiment of the present invention where ranges are used.

As shown, index diagram 210 indicates that indexes A, C, D, F, G, H, J are unavailable to be allocated to a new resource. The unavailable indexes depicted in column 210A are unavailable because the indexes are already associated with one or more resources. The unallocated indexes of column 210B are not even available for allocation or association to one or more resources in this example. Thus, indexes B, E, I, K, L, M, N would have to first be created and then allocated in an embodiment of the invention. In a preferred embodiment, a bitmap is employed to identify indexes that are available for allocation. Bitmap 212 is an illustrative bitmap that corresponds to index diagram 210. Bitmap 212 includes an index row 212A and a Bit row 212B. For illustrative purposes, a "1" indicates that a resource is in use—and thereby unavailable for allocation—and a "0" indicates that an index is not currently allocated. For example, index A has a corresponding bit of "1" and index B has a corresponding bit of "0." Thus, index A is currently associated with a resource while index B is not.

In a preferred embodiment, multiple bitmaps 212 are stored as arrays of characters with each character in the array representing eight indexes each. Each character in the array is an offset to which each bit in the bitmap will base its math. For example and without reference to FIG. 2, an array of two characters may be offset 0 and offset 1 to access the character in the array. Because each character is eight bits and a character is one byte, bit offset 0 in byte offset 0 could represent index 1 if the alignment for the index range starts at 1. We can also conclude the bit offset 0 in byte offset 1 represents index 9 since the first byte had eight bits representing indexes 1 through 8.

Although the foregoing examples are provided with letters to indicate indexes, indexes can be identified using a variety of formats including numerical or alphanumerical strings. A more specific example of associating indexes with index-based resources is provided with reference to FIG. 3.

Figure 3:
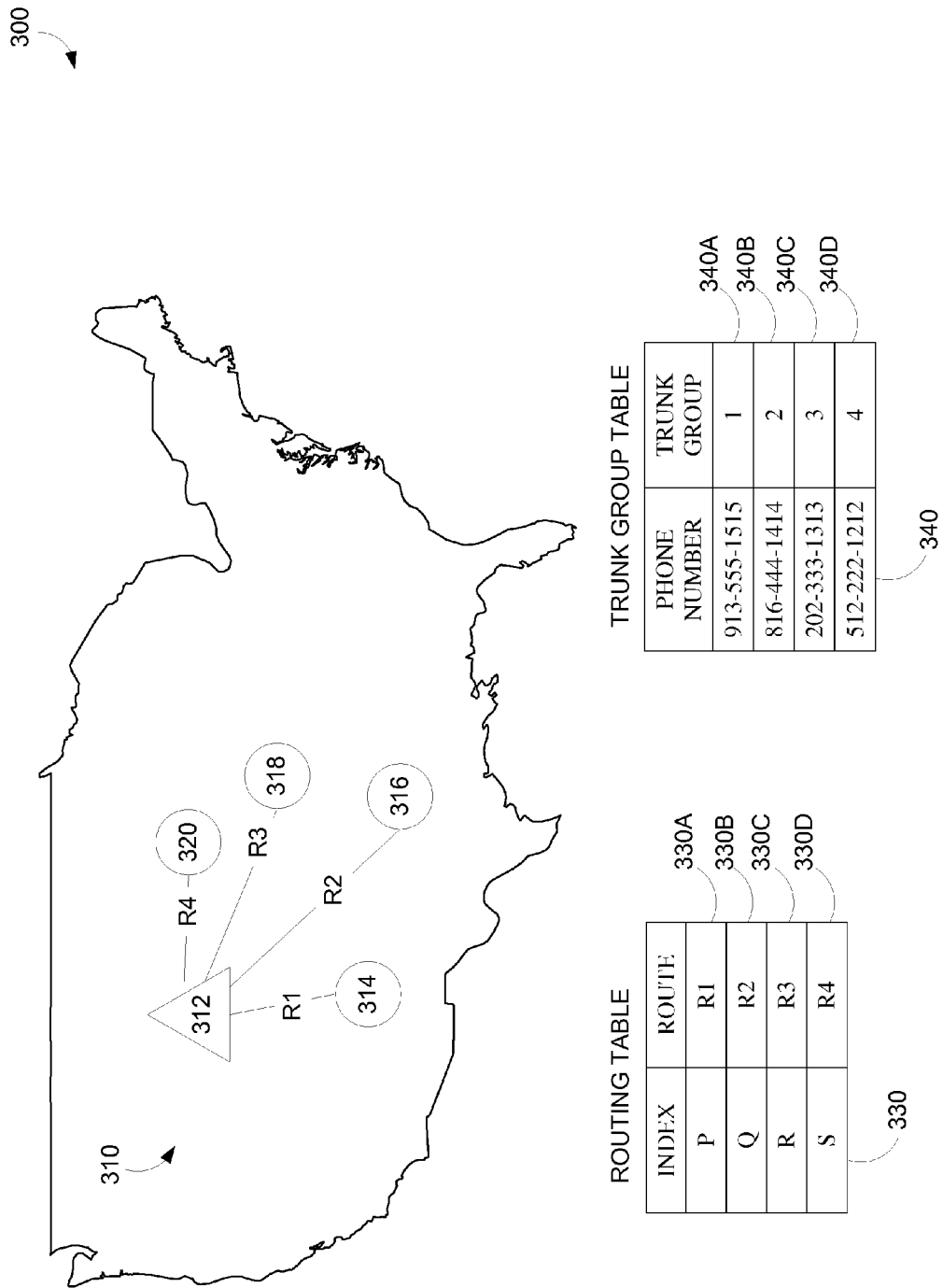
FIG. 3 depicts an oversimplified route diagram, routing table, and trunk-group table used to illustrate portions of functionality offered by an embodiment of the present invention.

Turning now to FIG. 3, a simplified resource mapping 310 is provided along with illustrative routing and Trunk-group tables. Routing diagram 310 includes a switch 312 coupled to index-based resources 314, 316, 318, and 320 by respective routes R1, R2, R3, and R4. Switch 312 may also be switch 114 of FIG. 1. Index-based resources 314-320 represent any resource that benefits from being associated with an index. Indexes can provide a useful way of identifying resources. As previously mentioned, resources 314-320 may take the form of additional switches, central offices, terminating points, and/or network elements, such as routers, gateways, hubs, signal-transfer points, and the like. Routing table 330 associates routes R1-R4 with respective indexes P, Q, R, S using four rows, 330A, 330B, 330C, and 330D. Row 330A indicates that route R1—coupling resource 314 to switch 312—is associated with index P. Row 330B indicates that route R2—coupling resource 316 to switch 312—is associated with index Q. Rows 330C and 330D similarly associate routes R3 and R4 with indexes R and S. Trunk-group table 340 is composed of a phone-number column, a trunk-group column and four rows, 340A, 340B, 340C, and 340D. Trunk-group table 340, oversimplified for explanatory purposes, associates a phone number with a trunk group. Thus, phone number "913-555-1515" is associated with trunk group "1" as indicated by row 340A. Similarly, phone number "816-444-1414" is associated with trunk group "2" as indicated by row 340B. Rows 340C and 340D similarly associate respective phone numbers with trunk groups 3 and 4. The present invention provides a fast and efficient method to allocate index P as an index associated with phone number "913-555-1515." Using the present invention, any index of table 330 can be quickly and easily associated with any phone number, or other termination identifier, of table 340. Associating an index with a phone number as illustratively explained above, represents an oversimplified illustration of the functionality offered by the present invention. In practical applications, tables may be indirectly related to one another through multiple relationships established through several tables, which may have several tens or hundreds of thousands of rows. An exemplary method for practicing the present invention is provided in FIG. 4.

Figure 4:
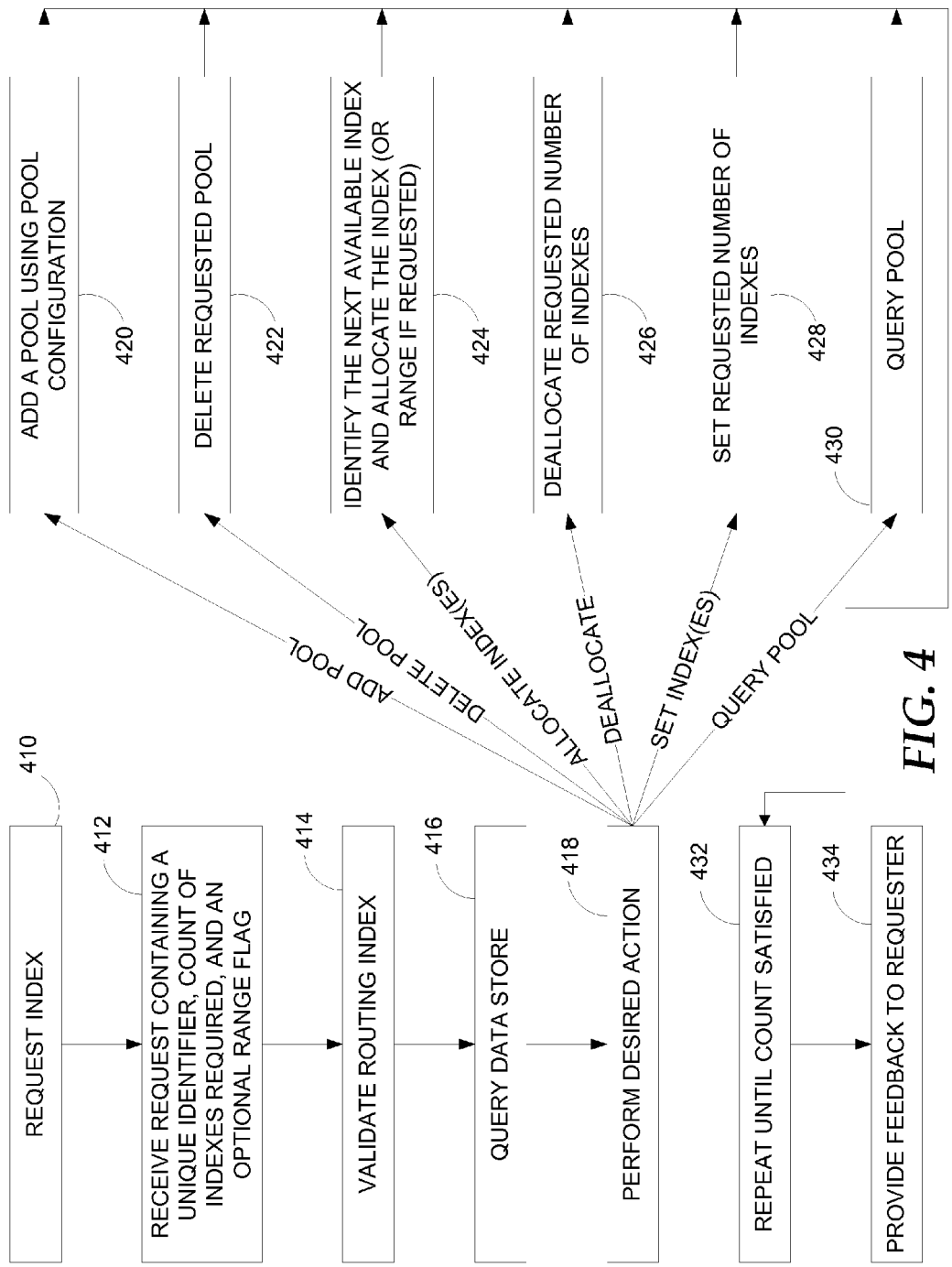
FIG. 4 is a flow diagram illustrating an exemplary method for manipulating resource indexes in accordance with an embodiment of the present invention.

Turning now to FIG. 4, an illustrative process for practicing the present invention is illustrated in greater detail. At a step 410, an index is requested. In a preferred embodiment, user 110 requests an index to be allocated to a resource. As previously mentioned, user 110 may be a person, machine, or computer application. The request is a request to associate an index with a specific index-based resource. At a step 412, the request is received by IBRM 112 that contains a unique identifier, an optional count of indexes required, and an optional range flag. The index-based resource unique identifier can take on a variety of forms and can be defined by user 110. The unique identifier may have multiple keys and can be a group of resources such as a group of tables or a group of physical network elements. The number of indexes requested is provided by a count value. Thus, if four indexes are required, a count value of "4" is provided.

The optional range flag, if set, indicates a specific range of indexes from which indexes should be allocated. If a range flag is provided, then additional parameters are provided that describe the range from which to select available indexes. Ranges were illustrated with reference to FIG. 2 and Table II above. In Table II above, a begin-range and an end-range parameter are provided to indicate a beginning and stopping point that describe a range from which indexes should be selected. If no range flag is provided, then the entire range of indexes are potential candidates for allocation. At a step 414, the routing index is validated. Validation is not a necessary step but provides additional integrity to the present invention. IBRM 112 validates that the index identifier is valid. At a step 416, data store 116 is queried consistent with the desired action, which is performed at a step 418.

Before performing the desired action, concurrent processing is locked from accessing data that may be modified. In a preferred embodiment, the present invention uses a mutex (mutual exclusion object) to provide an exclusive mode where only one entity can modify data. The mutex is used by all applications or managers of the index-based resources when reading and modifying relevant data. The mutex blocks reading from occurring and data from being modified when more than one process or activity attempts to access the same data at the same time.

As previously mentioned, data store 116 houses a representation of the data stored in switch 114. Thus, data store 116 can be queried to determine what indexes are available to be allocated or deallocated. If the desired action is to add a pool, then a pool is added using the provided configuration at a step 420. Exemplary pseudocode for adding a pool in accordance with an embodiment of the present invention follows:

```
INSERT INTO =POOL
    (
    POOL_ID,
    ACCESS_KEY_CD,
    SW_ID,
    SEG_OFFSET_CD,
    SEG_BITMAP,
    NXT_INDEX
    )
VALUES
    (
    :MY_POOL_ID,
    :MY_ACCESS_KEY_CD,
    :MY_SW_ID,
    :MY_SEG_OFFSET,
    :MY_SEG_BITMAP,
    :MY_NXT_INDEX
    );
INSERT INTO =POOL_LIST
    (
    POOL_ID,
    SW_ID,
    ACCESS_KEY_CD
    )
VALUES
    (
    :MY_POOL_ID,
    :MY_SW_ID,
    :MY_ACCESS_KEY_CD
    );
```

If the request is to delete a pool, then the designated pool is deleted at a step 422. Exemplary pseudocode for deleting a pool in accordance with an embodiment of the present invention follows:

```
DELETE
    FROM
        =POOL_LIST
    WHERE
        POOL_ID = :MY_POOL_ID AND
```

```
            SW_ID = :MY_SW_ID AND
            ACCESS_KEY_CD = :MY_ACCESS_KEY_CD
        FOR
            STABLE ACCESS;
    DELETE
        FROM
            =POOL
        WHERE
            POOL_ID = :MY_POOL_ID AND
            SW_ID = :MY_SW_ID AND
            ACCESS_KEY_CD = :MY_ACCESS_KEY_CD
        FOR
            STABLE ACCESS;
```

If the request is to allocate one or more indexes, then the present invention identifies the next available index and allocates the index or indexes. If a range is provided, then a selection is made from the prescribed range. In a preferred embodiment, the present invention does not merely start looking for an available index from the first index. As indexes are deallocated, or otherwise become available, their availability can be stored for future reference. Storing an indication of what indexes are available to be allocated reduces the time associated with identifying an available index.

To allocate an index an Allocate module ("Allocate") is called in a preferred embodiment. The following illustration is related to the more complicated case where the search is to start at or above a provided index. Allocate retrieves the configuration information from POOL_TYPE table 118 for the provided Switch ID and Pool ID (Table I). Allocate performs a cursor on POOL table 124 for the provided keys where the NXT_INDEX (Table IV) field is a certain parameter, such as not "−1" (full), and the SEG_OFST_CD is greater than or equal to the one that contains the provided index. To determine this, Allocate determines a normalized index by subtracting the ALIGNMNT_CD from the provided index, incrementing the result, and dividing the answer by the segment size (such as 1024). Adding "1" to this quotient yields the actual pool segment to begin work in. Allocate retrieves the first record and checks the NXT_INDEX field to start filling the previously mentioned index list with indexes from the SEG_BITMAP for that record If a provided "At or Above Flag" is specified for "At," Allocate checks to see if that index is less than the NXT_INDEX value. If it is, an error message can be provided.

Allocate then determines the correct offset into the bitmap by using the math as follows: subtract ALGNMNT_CD from the requested index and add "1" to determine a relative index to position 1 (bit 0) in that bitmap for that pool segment. Multiply (SEG_OFST_CD−1) of that record by 1024 (or other segment size) to determine the last index that the previous pool segment can hold. Identify what bit in the bitmap holds the relative index by subtracting the last index of the previous pool segment from the relative index. If the requested index has the ABOVE flag checked, start from that point +1 to allocate indexes until the bitmap has been exhausted. Otherwise, start from that point to allocate indexes until the bitmap has been exhausted.

If the request can be satisfied for the number of indexes in that range, then identify the next available index. If no more indexes are available, update NXT_INDEX to −1 in this embodiment. Mark all indexes for allocated as used and return from the Allocate module. If indexes were available, update NXT_INDEX to the next available index and mark all indexes allocated as used. Return from Allocate module. If the request cannot be filled with that pool segment, retrieve the next one and perform the same logic recited above. Allocate returns a list of indexes that have been allocated.

```
SELECT
    SEG_BITMAP,
    NXT_INDEX
FROM
    =POOL
WHERE
    POOL_ID = :MY_POOL_ID AND
    SW_ID = :MY_SW_ID AND
    ACCESS_KEY_CD = :MY_ACCESS_KEY_CD AND
    SEG_OFFSET = :MY_SEG_OFFSET
FOR
    REPEATABLE ACCESS IN EXCLUSIVE MODE;
UPDATE
=POOL
SET
    SEG_BITMAP = :MY_SEG_BITMAP
    NXT_INDEX = :MY_NXT_INDEX
WHERE
    POOL_ID = :MY_POOL_ID AND
    SW_ID = :MY_SW_ID AND
    ACCESS_KEY_CD = :MY_ACCESS_KEY_CD AND
    SEG_OFFSET = :MY_SEG_OFFSET
FOR
    REPEATABLE ACCESS IN EXCLUSIVE MODE;
```

If the desired action was to deallocate an index, then IBRM 112 deallocates the indicated index at a step 426. The deallocation process is similar to the Allocate process described above but is transposed where appropriate. The configuration information is retrieved from Pool_Type table 118 and Pool_Exclsn table 120 for a given switch and pool. An error message can be provided if requested indexes are in the exclusion ranges. The records corresponding to the indexes to be deallocated are identified. Those indexes are then denoted as unused. Exemplary pseudocode for deallocating indexes in accordance with an embodiment of the present invention follows:

```
SELECT
    SEG_BITMAP,
    NXT_INDEX
FROM
    =POOL
WHERE
    POOL_ID = :MY_POOL_ID AND
    SW_ID = :MY_SW_ID AND
    ACCESS_KEY_CD = :MY_ACCESS_KEY_CD AND
    SEG_OFFSET = :MY_SEG_OFFSET
FOR
    REPEATABLE ACCESS IN EXCLUSIVE MODE;
UPDATE
=POOL
SET
    SEG_BITMAP = :MY_SEG_BITMAP
    NXT_INDEX = :MY_NXT_INDEX
WHERE
    POOL_ID = :MY_POOL_ID AND
    SW_ID = :MY_SW_ID AND
    ACCESS_KEY_CD = :MY_ACCESS_KEY_CD AND
    SEG_OFFSET = :MY_SEG_OFFSET
FOR
    REPEATABLE ACCESS IN EXCLUSIVE MODE;
```

If the desired action was to set a requested number of indexes, then those indexes are set at a step 428. This method is useful in scenarios where a pool database is to be synchronized with an external table. This will allow a user to set bits on or off in the table without sending back the indexes allocated or deallocated.

If the desired action of step 418 was to query a pool, then IBRM 112 queries the identified pool at a step 430 consistent with the provided parameters. Exemplary pseudocode for querying indexes in accordance with an embodiment of the present invention follows:

```
SELECT
    SEG_BITMAP,
    NXT_INDEX
FROM
    =POOL
WHERE
    POOL_ID = :MY_POOL_ID AND
    SW_ID = :MY_SW_ID AND
    ACCESS_KEY_CD = :MY_ACCESS_KEY_CD AND
    SEG_OFFSET = :MY_SEG_OFFSET
FOR
    REPEATABLE ACCESS IN EXCLUSIVE MODE;
OR
DECLARE QUERY_CURSOR CURSOR FOR
SELECT
    SEG_BITMAP,
    NXT_INDEX
FROM
    =POOL
WHERE
    POOL_ID = :MY_POOL_ID AND
    SW_ID = :MY_SW_ID AND
    ACCESS_KEY_CD = :MY_ACCESS_KEY_CD AND
    SEG_OFFSET >= :MY_SEG_OFFSET1 AND
    SEG_OFFSET <= :MY_SEG_OFFSET2
FOR
    BROWSE ACCESS;
```

At a step 432, the desired process is repeated for as many times as was indicated by the count variable. Thus, if five indexes were requested to be allocated, then the allocation step would repeat five times. In alternative embodiments, the functionality of step 432 is carried out at the same time as the desired task. Thus, if a request that five indexes be allocated, they may be allocated all at once; or if ten indexes are to be deallocated, they can all be deallocated at once. At a step 434, appropriate feedback is provided to the requester. The feedback provided is determined by the desired action. For instance, if a pool was added, then the feedback provided to user 110 may take the form of a "success" message. If a set of indexes were requested, then the feedback may indicate which resources were allocated indexes and which resources were not, as the case may be. If a pool was queried, then the results of that query would be provided to user 110 at a step 434.

An additional novel aspect of the present invention is its ability to facilitate transactional processing. Transactional processing refers to the ability to confirm that the desired action actually took place. For instance, if a request was received to allocate an index, but for some reason that index was unable to be allocated, then the present invention provides for that index to be automatically deallocated and therefore available to be associated with alternative resources.

Absent the present invention, if index requests were made and granted, no indication was provided if that resource was not actually allocated. The present invention contemplates that although a request to allocate an index may be granted, there exists the possibility that the index may not actually become associated with the desired resource for a variety of reasons. For instance, if a request was made to allocate an index to a specific network element, but in attempting to associate that index with the network element, the present invention determines that the network element does not exist, then associating the index with the desired resource would be impossible. Although the request was granted, the index was not actually associated with the resource. In such a situation, the index may be deallocated and thus available for subsequent allocation.

By forcing the requests to pass through IBRM 112, IBRM 112 can monitor what resources have been allocated and thereby prevent duplicate allocations in concurrent-processing situations. Whereas in the past, the possibility existed that if a second person requested an index while a first person was being granted an index, then that index may be granted to both requesting persons. In such a situation this error may not be known until the applicable resource is put into use. In such a situation, one of the requesting parties would not be aware of the error until a customer complains of poor service. By providing transactional processing, the present invention eliminates the possibility of duplicate index assignments.

As can be seen, the present invention and its equivalents are well-adapted to allocating indexes to resources of a telecommunications network. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described. Not all steps of the aforementioned flow diagrams are necessary steps.

The invention claimed is:

1. One or more computer-storage media having computer-executable instructions embodied thereon for performing a method for assigning dynamic indexes to one or more index-based resources, the method comprising:
   providing an index-based-resource manager (IBRM), wherein said IBRM includes one or more data structures that store at least one of unique pools available for assignment, segments of the unique pools available for assignment, types of the unique pools available for assignment, or assignment-excluded unique pools;
   providing a request for one or more dynamic indexes to be assigned to respective one or more resources;
   directing said request to said IBRM, which facilitates a process including:
   (1) identifying one or more dynamic indexes available to be respectively assigned to said one or more resources;
   (2) assigning said one or more indexes to said one or more resources, wherein each of said indexes is uniquely assigned to only one resource; and
   (3) preventing said identified one or more dynamic indexes from being modified for the duration of assignment to said one or more resources.

2. The computer-storage media of claim 1, wherein said one or more dynamic indexes are identifiers associated with said respective one or more resources.

3. The computer-storage media of claim 2, wherein said one or more resources are network components of a computer network, including a communications network.

4. The computer-storage media of claim 3, wherein said network components include one or more selections from the following:
- a database table,
- a data-routing component;
- a switching component; and/or
- a signal-transfer component.

5. The computer-storage media of claim 3, wherein identifying one or more dynamic indexes includes querying a data storage device that houses resource information related to said one or more resources; wherein said resource information includes an indication as to whether an available index is currently in use.

6. The computer-storage media of claim 5, wherein identifying one or more dynamic indexes comprises beginning a search for said one or more indexes from a predetermined index location.

7. The computer-storage media of claim 5, wherein identifying one or more dynamic indexes comprises selecting said one or more indexes from a predetermined range of indexes.

8. The computer-storage media of claim 1, further comprising releasing one or more dynamic indexes from assignment to said respective one or more resources.

9. A system including a processor and a memory for preventing duplicate resource-index assignments in a communications networking environment, the system comprising:
- an index-based-resource manager (IBRM) for receiving requests to manipulate dynamic indexes associated with one or more network resources such that none of said dynamic indexes can be assigned to a plurality of network resources, wherein said IBRM includes one or more data structures that store at least one of unique pools available for assignment, segments of the unique pools available for assignment, types of the unique pools available for assignment, or assignment-excluded unique pools;
- a data store coupled to said IBRM storing said dynamic indexes; and
- a user interface coupled to said IBRM for communicating index data associated with manipulating said dynamic indexes.

10. The system of claim 9, wherein said network resources include one or more selections from the following: a communications pathway, a database component, a hardware element, or a logical data representation.

11. The system of claim 10, wherein said IBRM includes a first set of computer-useable instructions embodied on one or more computer-readable storage media that:
- performs a query on said data store incident to a request to manipulate one or more of said indexes;
- identifies a set of indexes consistent with said query; and
- communicates an indication of the availability or the lack of availability of said identified set of indexes to a requesting component.

12. The system of claim 11, wherein said IBRM houses said indexes.

13. The system of claim 12, wherein manipulating said indexes includes allocating indexes to one or more resources.

14. The system of claim 13, wherein manipulating said indexes includes de-allocating indexes to one or more resources.

15. Utilizing the system of claim 9 to uniquely allocate indexes to resources in a networking environment.

16. One or more computer-storage media having computer-executable instructions embodied thereon for performing a method of assigning dynamic indexes to one or more index-based resources and releasing said indexes from assignment, the method comprising:
- providing an index-based-resource manager (IBRM), wherein said IBRM includes one or more components storing unique pools available for assignment, segments of the unique pools available for assignment, types of the unique pools available for assignment, or assignment-excluded unique pools;
- providing a request to said IBRM for one or more dynamic indexes to be assigned to respective one or more resources, said IBRM facilitating a process including:
  (1) identifying one or more dynamic indexes available to be respectively assigned to said one or more resources;
  (2) assigning said one or more indexes to said one or more resources, wherein each of said indexes is uniquely assigned to only one resource;
  (3) preventing said identified one or more dynamic indexes from being modified for the duration of assignment to said one or more resources; and
  (4) releasing said one or more indexes from assignment upon said one or more resources completing one or more tasks requiring the use of said one or more indexes.

17. The computer-storage media of claim 16, wherein said one or more resources include one or more selections from the following:
- a database table,
- a data-routing component;
- a switching component; and/or
- a signal-transfer component.

18. The computer-storage media of claim 17, wherein identifying one or more dynamic indexes includes querying a data storage device that houses resource information related to said one or more resources; wherein said resource information includes an indication as to whether an available index is currently in use.

19. The computer-storage media of claim 18, wherein identifying one or more dynamic indexes comprises beginning a search for said one or more indexes from a predetermined index location.

20. The computer-storage media of claim 18, wherein identifying one or more dynamic indexes comprises selecting said one or more indexes from a predetermined range of indexes.

* * * * *